(12) United States Patent
Williams et al.

(10) Patent No.: US 7,243,323 B2
(45) Date of Patent: Jul. 10, 2007

(54) INTEGRATED CIRCUIT CHIP DESIGN

(75) Inventors: Ted E. Williams, Los Gatos, CA (US);
Jonathan Ferro, Cupertino, CA (US);
DeForest Tovey, Los Gatos, CA (US);
Louis Tseng, San Jose, CA (US)

(73) Assignee: Infineon Technologies AG, Munich (DE)

( * ) Notice: Subject to any disclaimer, the term of this patent is extended or adjusted under 35 U.S.C. 154(b) by 140 days.

(21) Appl. No.: 10/231,384

(22) Filed: Aug. 29, 2002

(65) Prior Publication Data

US 2003/0051222 A1 Mar. 13, 2003

(51) Int. Cl.
*G06F 17/50* (2006.01)
(52) U.S. Cl. .................... 716/6; 716/4; 716/5
(58) Field of Classification Search ............ 716/2, 716/4–7, 12–14, 18; 703/13–16, 19; 713/600–601
See application file for complete search history.

(56) References Cited

U.S. PATENT DOCUMENTS

| | | | | |
|---|---|---|---|---|
| 5,258,660 A | * | 11/1993 | Nelson et al. | 327/141 |
| 5,259,006 A | * | 11/1993 | Price et al. | 375/356 |
| 5,452,239 A | * | 9/1995 | Dai et al. | 703/19 |
| 5,507,029 A | * | 4/1996 | Granato et al. | 716/6 |
| 5,557,779 A | * | 9/1996 | Minami | 716/6 |
| 5,602,754 A | * | 2/1997 | Beatty et al. | 716/6 |
| 5,696,771 A | | 12/1997 | Beausang et al. | |
| 5,740,347 A | * | 4/1998 | Avidan | 714/33 |
| 5,768,159 A | * | 6/1998 | Belkadi et al. | 703/19 |
| 5,801,958 A | * | 9/1998 | Dangelo et al. | 716/18 |
| 5,896,299 A | * | 4/1999 | Ginetti et al. | 716/4 |
| 5,936,867 A | * | 8/1999 | Ashuri | 716/6 |
| 5,956,257 A | | 9/1999 | Ginetti et al. | |

(Continued)

FOREIGN PATENT DOCUMENTS

JP 11-306218 11/1999

(Continued)

OTHER PUBLICATIONS

T. Koga et al., "Mega-gate ASIC Implement design", a technical report of IEICE, The Institute of Electronics, Information and Communication Engineers, vol. 98, No. 293, pp. 71-77 (Sep. 1998).

*Primary Examiner*—Jack Chiang
*Assistant Examiner*—Naum B. Levin
(74) *Attorney, Agent, or Firm*—Dickstein Shapiro LLP

(57) ABSTRACT

Method of developing a model of a circuit design including the steps of generating four different path-tracing runs, creating four arcs from the four different path-tracing runs, and combining the four arcs into two separate models. Also, a method of adjusting timing of a clock signal provided to a first block and a second block where data signals travel via a first path from the first block to the second block and data signals travel via a second path from the second block to the first block and the time for the data signals to travel the first path is greater than the time for the data signals to travel the second path. The clock signal provided to the second block relative to the clock signal provided to the first block is delayed by an amount that is a function of the difference between the time for the data signals to travel the first path and the time for the data signals to travel the second path.

4 Claims, 13 Drawing Sheets

U.S. PATENT DOCUMENTS

| | | | |
|---|---|---|---|
| 6,009,248 A * | 12/1999 | Sato et al. .................... | 716/2 |
| 6,266,803 B1 * | 7/2001 | Scherer et al. ................ | 716/12 |
| 6,272,667 B1 * | 8/2001 | Minami et al. ................ | 716/6 |
| 6,311,313 B1 * | 10/2001 | Camporese et al. ........... | 716/6 |
| 6,484,268 B2 * | 11/2002 | Tamura et al. ............... | 713/600 |
| 6,539,536 B1 * | 3/2003 | Singh et al. .................. | 716/18 |
| 6,557,151 B1 * | 4/2003 | Donath et al. ................ | 716/6 |
| 6,584,436 B2 * | 6/2003 | Hellestrand et al. .......... | 703/13 |
| 6,594,805 B1 * | 7/2003 | Tetelbaum et al. ............ | 716/5 |
| 6,609,233 B1 * | 8/2003 | Foltin et al. .................. | 716/6 |
| 6,701,505 B1 * | 3/2004 | Srinivasan .................... | 716/10 |
| 6,711,719 B2 * | 3/2004 | Cohn et al. .................... | 716/2 |
| 2001/0010090 A1 * | 7/2001 | Boyle et al. .................... | 716/2 |
| 2001/0034593 A1 * | 10/2001 | Cooke et al. .................. | 703/14 |
| 2002/0073380 A1 * | 6/2002 | Cooke et al. .................. | 716/1 |
| 2002/0162086 A1 * | 10/2002 | Morgan ........................ | 716/18 |
| 2003/0033580 A1 * | 2/2003 | Cohn et al. .................... | 716/2 |

FOREIGN PATENT DOCUMENTS

JP  2000-286342  10/2000

* cited by examiner

INTEGRATED CIRCUIT CHIP DESIGN

BACKGROUND AND SUMMARY OF THE INVENTION

This relates to the design of integrated circuit (IC) chips and more particularly to the design of IC chips having on the order of 10,000,000 gates.

Multi-million gate chip designs require hierarchy to be achievable in manageable and predictable schedules. Ensuring that timing will converge to a chosen goal requires early timing budgets, abstraction of simplified block routing and timing models, and proper margins along several axes.

The challenge for on-schedule physical implementation of multi-million gate chips starts with early floor planning and partitioning, and continues throughout the design flow with appropriate abstraction and approximations to get the most benefit out of all work expended. In particular, to achieve timing closure, each stage of the process must include sufficient margin and the overall project must focus on moving onwards to avoid getting stuck with spending too much time on premature optimizations. As a design closes in on tapeout, several different issues must converge simultaneously, and a useful concept is to incrementally relax added margins towards the desired target goals.

True Hierarchy

Improvement in the flat capacity of CAD tools still doesn't obviate the need for a hierarchical flow for top-end designs. A "truly hierarchical" flow supports making replicated instances of blocks that share a single abstraction each of their logic, timing, routing, and port location models. If different instances must end up having separate models anyway, then much of the advantage of hierarchy is lost. The point is that replicated block instances be used as truly identical objects so that the various design and analysis tasks done at a block level do not have to be repeated for each instance.

Another important characteristic of a truly hierarchical design flow is the containment of complexity by choosing an approach and algorithms such that no tool must see all of the flattened data except for final physical DRC/LVS (Design-Rule-Check/Layout-Versus-Schematic) mask checking.

In particular, the physical routing, parasitic extraction, and static timing analysis steps need to be separated such that top-level runs use only abstractions of instantiated blocks without seeing the full transistor, gate, or polygon databases within each of the blocks. This divide-and-conquer approach is essential to truly limit the amount of data seen by any one run and to ensure that virtual memory usage and job runtime stay reasonable.

Floorplanning and Partitioning

Partitioning of a design serves to break it into manageable pieces that can benefit from the parallelized effort of the individuals in a team. The goal is to allow separable progress of the work both for individual blocks and concurrently at the top-level. Another reason why flat approaches fail to provide timing convergence is because there is no good way to benefit from parallel work if final timing or routing is bottlenecked through single large runs. Instead, partitioning allows multiple people and licenses to be applied effectively. A good goal is to seek "equalized pain" between blocks and their parent in a hierarchical design, so that the block size is small enough that the effort of routing and timing closure at a block level is about the same as the effort required for their parent.

If some of the blocks are so large that they are much more difficult than their parent, then the overall projects' closure will be aided by cutting those blocks into smaller pieces, and "pushing" some of the complexity of their connections into the parent. Conversely, if the parent jobs for routing, extraction, or timing are too large, then it is worth encapsulating and pushing downwards some of the complexity by combining blocks or introducing another level of hierarchy. A good metric for the use of hierarchy is the "hierarchical re-use factor", which is the ratio of the number of block instances to the number of block types. Although very design dependent, a good partitioning should seek a re-use of around 3 to 4, which averages out so that some blocks are replicated many times while some unique blocks have only one instance.

Another good principle in choosing the granularity of partitioning is to ensure that no individual run takes more than 20 hours. By using a hierarchical divide-and conquer to cut and partition so that each individual computer job for routing, extraction, and timing completes in less than a day, based upon the speed of computers available to the design team, progress can be assured. Work must not become irrelevant by the time it completes. Further, for many reasons, there are huge project risks in depending upon any job that would take multiple days of runtime to complete because it might never complete due to power failures or program bugs that don't become apparent until too late. By abstraction and partitioning of blocks so that individual runs take a day or less, forward progress and valuable iterations proceed with reasonable cycle times for a few days per turn, including designer time to analyze results.

Given today's tools, we have found that a good rule-of-thumb for block size is to seek blocks that have about 150K placeable instances, or around 400K gates (nand2 equivalent standard gates). Even though tools could support blocks several times this size, it is less optimal for the overall project because individual blocks with 1M gates just take too long in runtime for all steps, and are too close to failing completely due to lack of real or virtual memory, even on machines with many gigabytes of memory.

Port location assignment is part of overall floorplanning and partitioning. As early judgment is important, a powerful concept is to use a linear "signal velocity" metric that allows top-level timing before the actual placement of repeaters. By assuming good repeaters will be inserted later, floorplanning tuning can proceed without getting lost in the wire resistance capacitance effects that scale quadratically with the length of wires without repeaters. For a given technology and wire width and spacing to neighbors, there is an optimal spacing between repeaters for long wires, and a corresponding idealized velocity of signals traveling down a wire that has perfectly positioned repeaters.

By de-rating the idealized velocity (for example, by cutting it in half), a design team can choose a velocity that will have enough margin for the realities of non-ideal repeater locations, non-ideal actual wire paths due to routing congestion, and fan-out prior to the next repeater along each branch. A top-level timing analysis can then combine the input arrival times and departure times of each block's ports with a timing of the parent's signals using the de-rated signal velocity on the Manhattan (x+y) distance pairwise between each output port and every input port it drives. In this way, top-level timing budgets and wirelengths can be driven to meet design goals and to prevent wires that have to cross the full chip, since this would take several clock cycles at today's frequencies.

Abstraction

One of the classic traps that some design approaches fall into, even after doing the hard work of partitioning and floorplanning, is to then choose analysis methods that don't preserve the isolation between parent and child in the hierarchy. For example, detailed capacitance abstraction shouldn't attempt to combine parent and child data, to "see" the wires above or below. Instead, it is better to simplify by crafting the extraction flows to just assume worst-case conditions do exist. For minimum capacitance values, this means assuming no wires, and for maximum capacitance values, assuming "gridded-sheets" of wires spaced at the routing pitch, in the preferred direction of each appropriate metal layer. While modeling solid-sheets of metal would be even more conservative, it is overkill, since the reality in the routed environment will be, at worst, the full-density grids of wires at the routing pitch.

Another classic trap that makes hierarchy less effective is the handling of the timing of the signals crossing the hierarchical boundaries. The quality of separation is lost if the child timing depends on how much load is applied to a signal by a parent, or if the parent timing depends upon how much internal routing is put on a wire before it gets to an output port.

We have found that the hierarchical abstraction can be strengthened by adding a buffer at every input and output port of every block, and placing that buffer physically very close to the port location. Even if a buffer is unneeded for other reasons, the isolation between parent and child nets is worth the negligible area cost to aid in timing convergence by being able to separate parent and child timing.

Complementary Timing Analysis

In modern 0.18 micron or smaller technology, minimum-pitched wires are taller than they are wide, and this means that cross-coupling to neighboring signals can often be in excess of 50% of a wire's total capacitance. The effect of simultaneous switching cannot be ignored, but it is also unrealistic to seek a precise determination of when every coupling combination can occur over the range of process spread. Therefore, safe and successful timing convergence requires conservative choices that bound delay calculation by minimum and maximum values rather than hopelessly seeking to find a single "exact" value.

Even after making conservative choices for the handling of cross-coupling, it is still important to add additional margin to account for the effects on timing of many other factors such as process spread, variations in dielectric thickness or permittivity, on-chip process tilt, on-chip variation in power-supply voltage-drops, and inaccuracies in extraction and transistor characterizations. Continuing with the theme of bounded minimum and maximum capacitance values, multiplicative margin can be added with respect to the nominal values, making good equations for Ceff, min and Ceff, max as follows:

$$Ceff.min=(1-x)*(Cvss.vdd+0*Ccoupling) \qquad (1)$$

$$Ceff.max=(1+x)*(Cvss.vdd+2*Ccoupling) \qquad (2)$$

The value of x can be chosen as desired, typically in the range of 0.05 to 0.10, where the margin introduced is, in effect, 2x. Remember, that since many of the otherwise-not-explicitly-counted factors are individually 10% effects, this margin is very much needed. Similar multiplicative margins are also suitable to apply to the wire resistance parasitics to account for the process variation in wire thickness and width, and for the on-chip localized temperature variations due to self-heating.

The minimum and maximum resistances and capacitances for every net allow us to calculate minimum and maximum delays for every net which can be backannotated using .sdf files into timing analyses. In a register (edge-triggered flop) based design, think of every setup and hold check as determining the results of a race ending at the receiving register. Both sides should be viewed as complementary duals of each other, where every setup check is based upon using the maximum delays through the launching register and combinational logic up to the receiving register, and the exact same paths with minimum delays are used for a hold check.

Furthermore, the paths used for these checks need to include the clock trees going back to the point of reconvergence between the parts of the clock distribution tree feeding the launching and receiving register. Thus, ordinary setup and hold checks also validate the quality of the clock distribution tree, emphasizing local skew instead of global skews, and allow for the possibilities of using "useful skew", as well as not penalizing bad skew where it wouldn't make any difference to the affected set up or hold checks anyway.

This rigorous and safe approach to clock tree analysis allows a much lower-power clock distribution scheme using tall clock trees with limited average fan-out, rather than the overkill of more common short-fat solutions that sometimes expend a third of the switching capacitance of the chip just in distributing a core clock.

Where hold checks do show violations with respect to a chosen added amount of margin, delay elements can be inserted. Sometimes, because of the conservative handling of minimum and maximum delay calculations, it can be a tricky balancing act to add delay elements in just the right way to fix the hold violations without degrading the setup paths too much. A useful concept is to write scripts that search the nets selected by fan-in cones of each receiving register input that has a hold violation (using minimum delay calculations) for the upstream point with the maximum setup slack (under the maximum delay calculations), and insert the delay buffer into that net. Often this means the hold-fix delay element must be inserted at a point that is adjacent to neither the launching register's output nor the receiving register's input, which is where most simplistic hold-fix algorithms usually would have placed them.

In the later stages of timing closure, the actual results from block level static timing analysis runs can be used to create models of the blocks that are used as objects in a top-level static timing analysis run. Of course, replicated instances will only need a single timing model for the block type, consistent with the choice that timing analysis of the blocks is not complicated by the instance-specific wires of overlying routing in the parent.

Moreover, since the paths leading from input ports to receiving registers, and the paths leading from final launching register up to output ports will have both minimum and maximum delays, both types of delay arcs need to be represented in the models constructed by use in the parent. Even though no commercial flow does this automatically, internal scripts can be written to combine these arcs into block level models so that timing analysis at a parent level can use the same duality for all setup and hold checks.

Closure

Adding sufficient margins early allows a design to converge with only a handful of iterations for each block type and for the top-level. By taking a conservative design style with full complementary checking of both sides of every setup and hold race, success is built into the process rather than risking being bitten by unaccounted-for coupling or noise issues found only after the silicon returns. The conservative delay calculation metrics discussed in this article also mean that there is upside that can be expected.

By choosing to base the delay calculations on worst-case values, a typical process spread will actually produce most parts well above the timing predicted by the worst-case model. Plus, the extra multiplicative timing margins built in by the factor x in equations (1) and (2), are also an additional upside factor between the "guaranteed" goal stated at tape-out and the actual attained clock frequencies proven by testing of the finished packaged parts across environmental conditions.

BRIEF DESCRIPTION OF THE DRAWINGS

These and other objects, features and advantages of the invention will be more readily apparent from the following detailed description of the invention in which.

DETAILED DESCRIPTION

Figure 1:
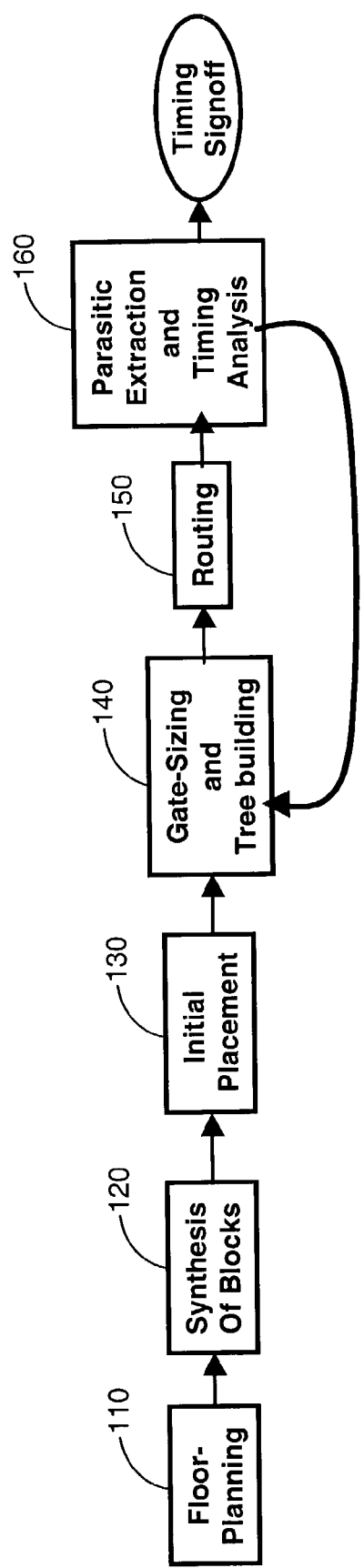
FIG. 1 is a block diagram illustrating the steps conventionally followed in the layout of an integrated circuit (IC)

FIG. 1 depicts the steps conventionally followed in layout of an IC. These steps include floorplanning 110, block synthesis 120, initial placement of blocks 130, gate sizing and clock tree building 140, routing 150, and parasitic extraction and timing analysis 160.

Timing analysis is ordinarily performed at the end of the process because of a perceived need to complete the design of both the parent and child elements of a hierarchical design before completing the timing analysis. For example, the parent element does not see the load (fan out) of the wires in the child block and connections between the parent element and the output of the child block can change the internal timing of the child block.

Timing analysis often reveals timing problems and the solution to these problems may often be to insert buffers into the inputs or outputs of various blocks. Such insertion of buffers typically requires rerouting of wires and further timing analysis due to wire congestion that may lead to additional iterations of buffer insertion, rerouting and timing analysis. Each iteration may require insertion of more buffers, additional rerouting of wires and further timing analysis.

Figure 2:
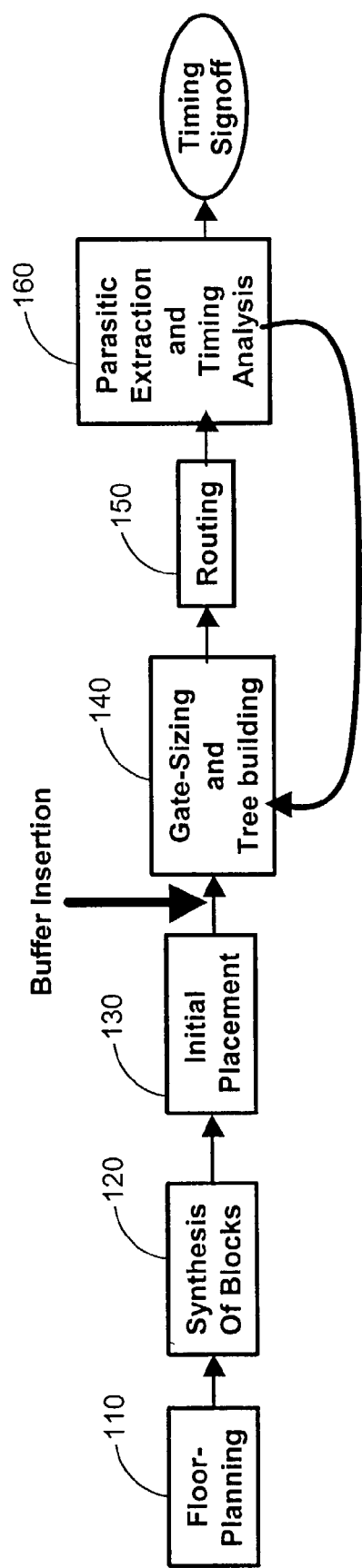
FIG. 2 is a block diagram illustrating the steps followed in the layout of an IC in accordance with the invention.

In accordance with the invention, buffers are inserted into every block input and every block output before timing analysis is ever performed. Preferably, as shown in the layout procedure of FIG. 2, where the same elements as in the procedure of FIG. 1 bear the same number, buffers are preferably inserted after the initial placement step 130 and before the gate sizing and tree building step 140.

Figure 3:
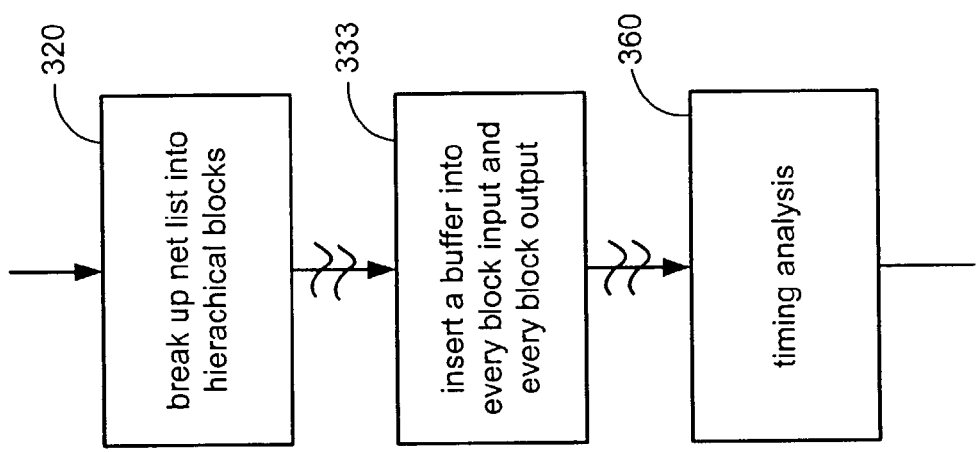
FIG. 3 is a block diagram further illustrating the layout of an IC in accordance with the invention.

More generally, as shown in FIG. 3, at some point in the layout procedure following the break up of the net list into hierarchical blocks as occurs at step 320 and before the performance of the timing analysis as occurs at step 360, a buffer is inserted at step 333 at every block input and every block output in the IC chip design. The buffers may be needed or not. Nevertheless they are inserted. As a result, the fan-in on all ports is limited to 1 and internal feedback paths are isolated from blocks placed on output ports by parent elements. Further, block timing analysis is forced to see the timing effect of wires to the ports which otherwise would only be seen by the parent timing analysis.

By isolating the wires in the parent element and children blocks, timing analysis issues are separated more cleanly and fewer timing iterations are required. The area cost of unnecessary buffers is negligible.

Another area for improvement in the design of an integrated circuit is in clock distribution, in particular, the distribution of a clock signal to all registers. Clock skew is the difference in the arrival times of clocks at launching and receiving register pairs. In a synchronous design, typically the goal is to make the skew as little as possible. Generally, skew is regarded as bad because the clock cycle must be lengthened (lowering performance) to account for the possibility that the receiving register has an earlier arriving clock signal than the launching register. However, it is well known that, under limited situations, skew can be advantageous if the launching register of a critical path has an earlier arriving clock than the receiving register, since it gives the path more time to propagate than the base clock cycle.

Figure 4:
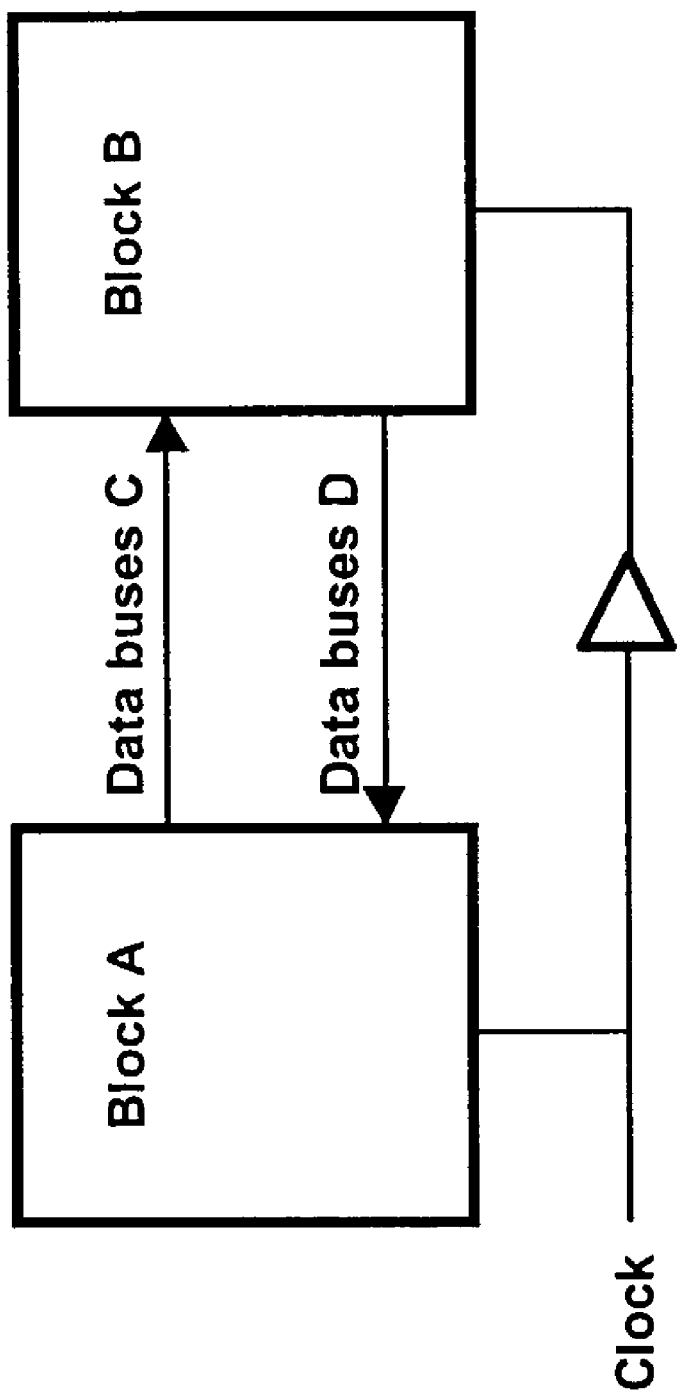
FIG. 4 is a block diagram useful in understanding an improvement of the present invention in clock distribution.

The same principles of clock skew apply at higher hierarchical levels when groups of logic and registers are connected together. The groupings can be at levels of just a few objects to hundreds of thousands of objects. FIG. 4 shows two blocks (A and B) where there is some data signals C traveling from A to B, and other data signals D that travel from B to A. Both blocks receive a clock from a parent level, and distribute it to their internal registers. Without loss of generality, consider the case shown where the clock distribution is adjusted to give B a later clock than the clock received at A. In this case, the skew between the two clock arrival times adds to the effective path delay of the D signals, and subtracts from the effective path delays of the C signals. If C and D had otherwise equal path lengths, then the skew would be a disadvantage. But in the situation where the C path delays (summing both delays inside of the blocks and delays in the connection between the blocks) started out longer than the D path delays, then the skew improves performance.

In a hierarchical design, blocks can be built and timing analyzed first, and then the parent level clock distribution adjusted to delay clocks going to the receiving blocks of the longest paths. The amount of useful delay added between each block pair is half of the difference between the longest path traveling towards the delayed-clock block, and the longest path traveling away from the delayed-clock towards the other block in the pair. Thus, after the clock delay is added, the data paths will then have equal minimum cycle time (maximum chip clock frequency).

Figure 5:
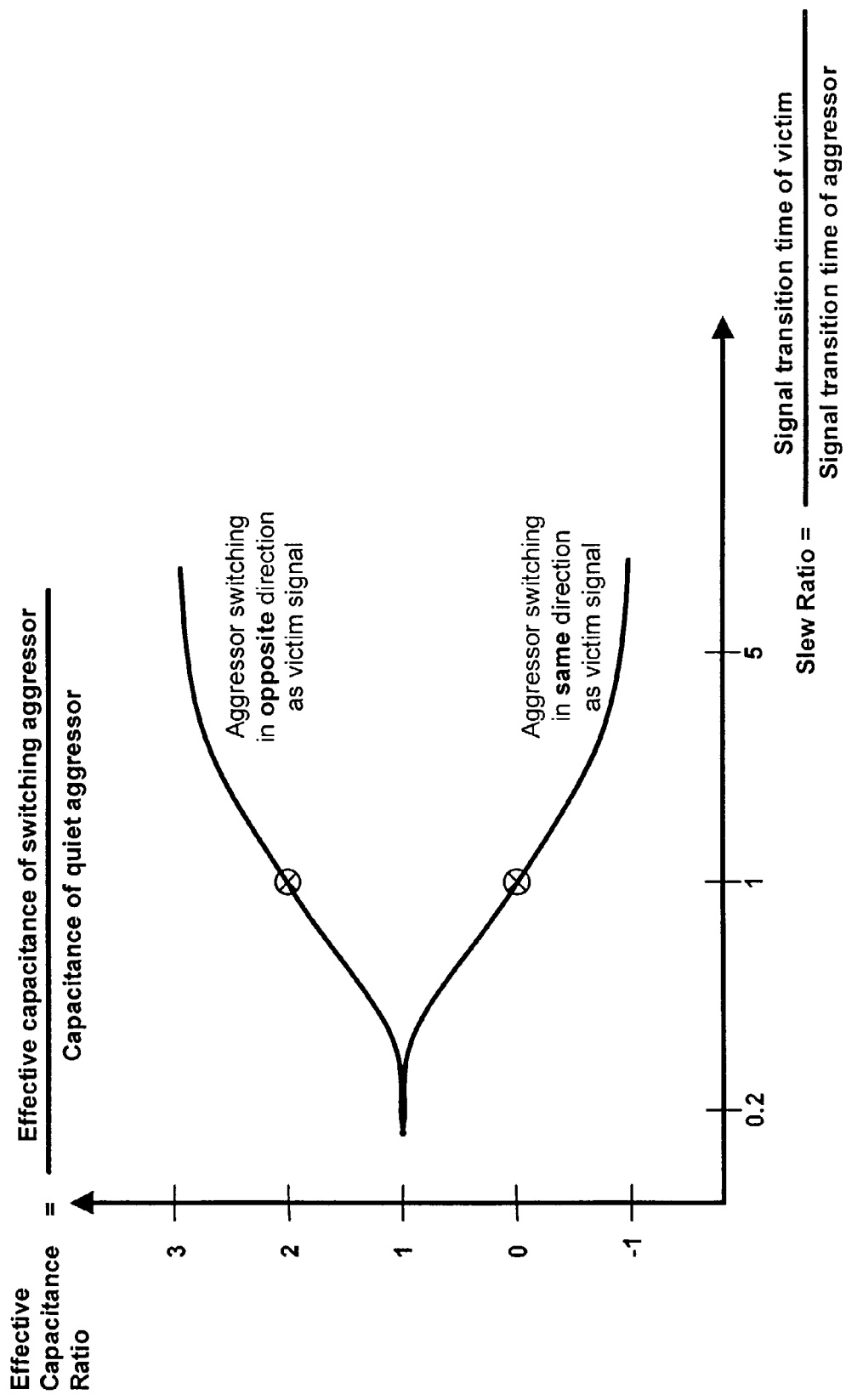
FIG. 5 is a diagram useful in understanding an improvement of the present invention in estimating cross-coupling capacitance.

As noted above, another design technique is to bound delay calculations by minimum and maximum values rather than hopelessly seeking to find a single "exact" value. An example of this approach is to map cross-coupling capacitance into bounded "effective" capacitance. FIG. 5 shows the possibilities of aggressors switching in either the opposite or same direction as the victim signal under analysis. While it is possible for a fast opposite-direction aggressor to have an effective capacitance of 3 or more times the actual nominal cross-coupling, it is a reasonable approximation to just set the effective cross-coupling capacitance to 2 times the nominal capacitance, which is still much more conservative than just neglecting the capacitance-multiplying effect of the switching. Likewise, while it is possible for a fast same-direction aggressor to have such a helping effect on the transition of a slow victim that the effective coupling capacitance should actually be negative, it s reasonable just to set the minimum effective capacitance value to zero. Note that when complete complementary timing checks use both maximum and minimum capacitances, it actually adds pessimism to make the minimum capacitance smaller. The simplicity and conservatism of applying these factors to all cross-coupling capacitances balances out the reality that many may not actually have overlapping switching, with the possibility that some aggressors may have a slightly worse effective capacitance multiple from FIG. 5. Even more rigorous detailed noise-checking tools can be used as a final step.

Figure 6:
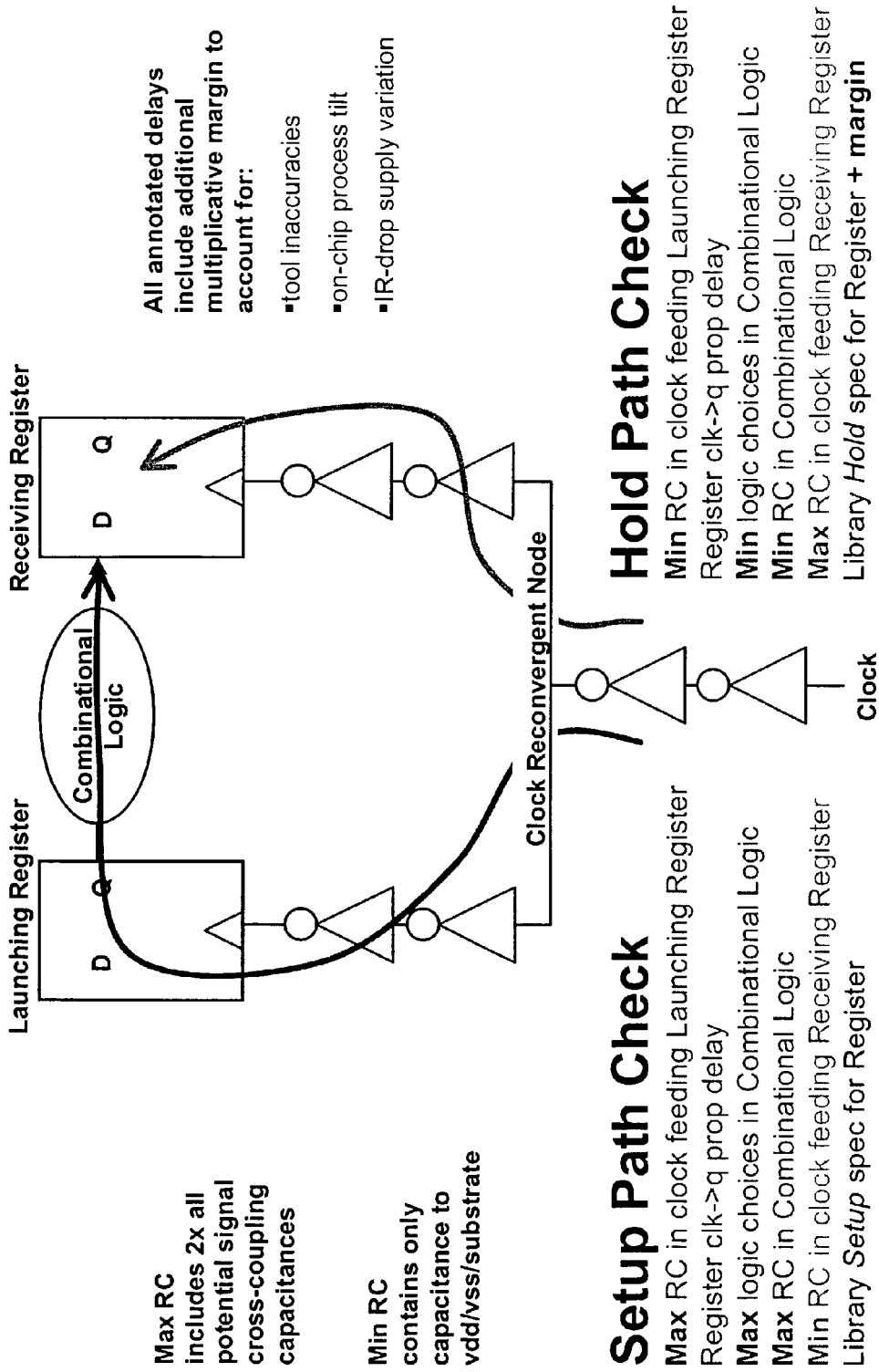
FIG. 6 is a diagram useful in understanding an improvement of the present invention in estimating timing delays.

Other design techniques relate to the analysis of timing paths. For a timing path that is to be analyzed at the gate level, rigorous analysis must trace paths through nets that have scaled-up and scaled-down net delay annotations along the clock and data lines to produce a worse-case situation to be compared against the constraint of the receiving register. For a setup constraint, maximum delays are used for the clock path to the receiving register. For a hold constraint, minimum delays are used for the clock path to the launching register and for the data path between the two registers, and maximum delays are used for the clock path to the receiving register (FIG. 6). This is more rigorous than just using nominal delays everywhere, although it was rarely done thoroughly before 0.25 um designs where cross-coupling capacitances were less severe. But, taken alone, the use of maximum and minimum simultaneously is well-known as the correct and rigorous approach, and some tools do support it for flat designs.

Figure 7:
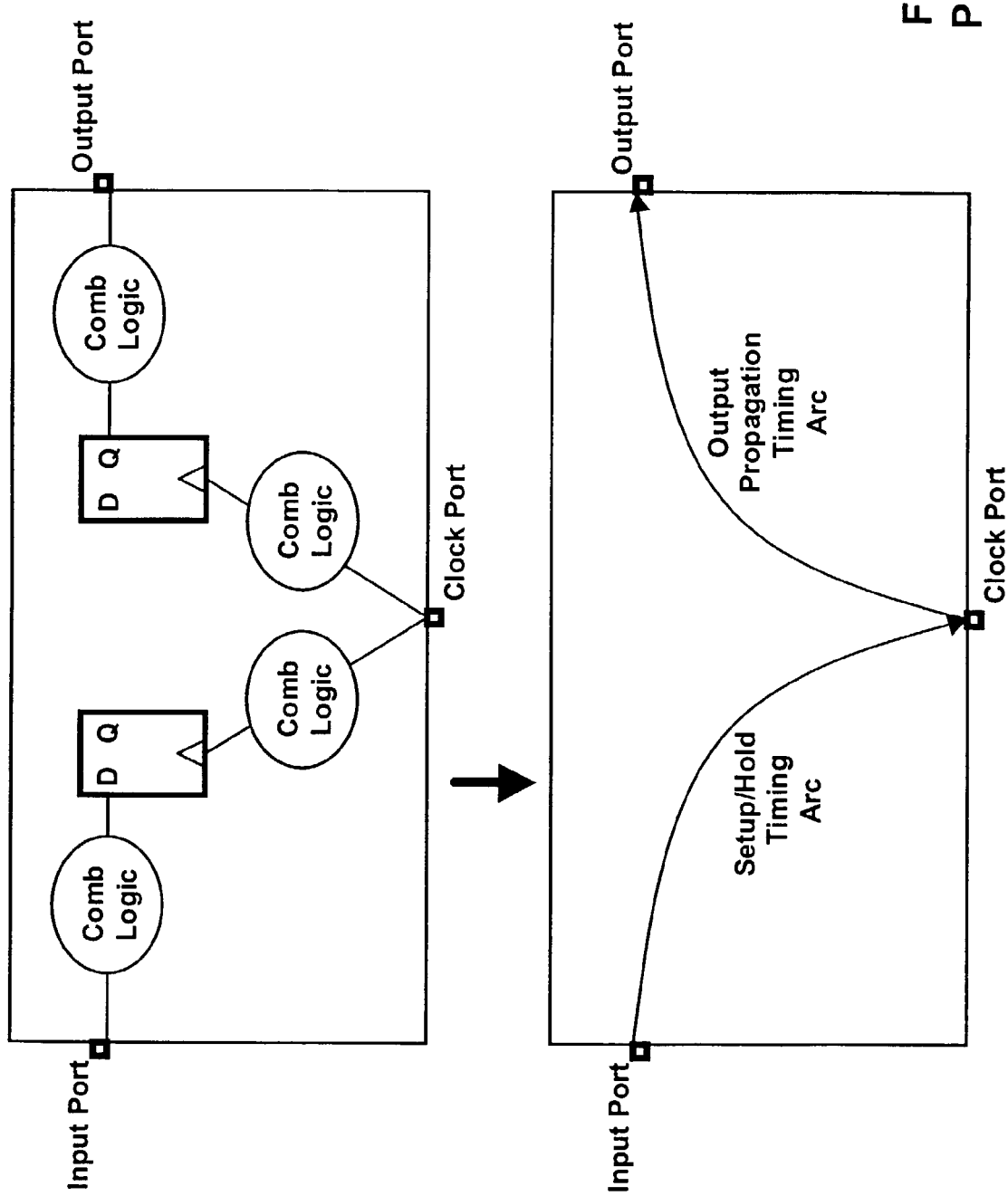
FIG. 7 is a pair of diagrams illustrating a prior art technique for estimating timing delays.

Abstraction of models is required for hierarchical methodologies. The abstraction (see FIG. 7) encapsulates the combinational logic and registers of an entire region (for example, hundreds of thousands of gates) into a block model (one commercialized format to express this is called a "STAMP" model) that leaves out the details of the interior of the block, and replaces paths starting at each input port with timing arcs from that port representing its setup and hold constraints to the clock port. Likewise, each path leading up an output port is replaced with an arc representing the clock->output (clk->q) constraint. In the prior art of FIG. 7, these replacements of paths with arcs were done using nominal (or typical) models only, which does not allow for the block models to be used as an instance in a parent run trying to do the more rigorous setup and hold checking of FIG. 6.

Figure 8:
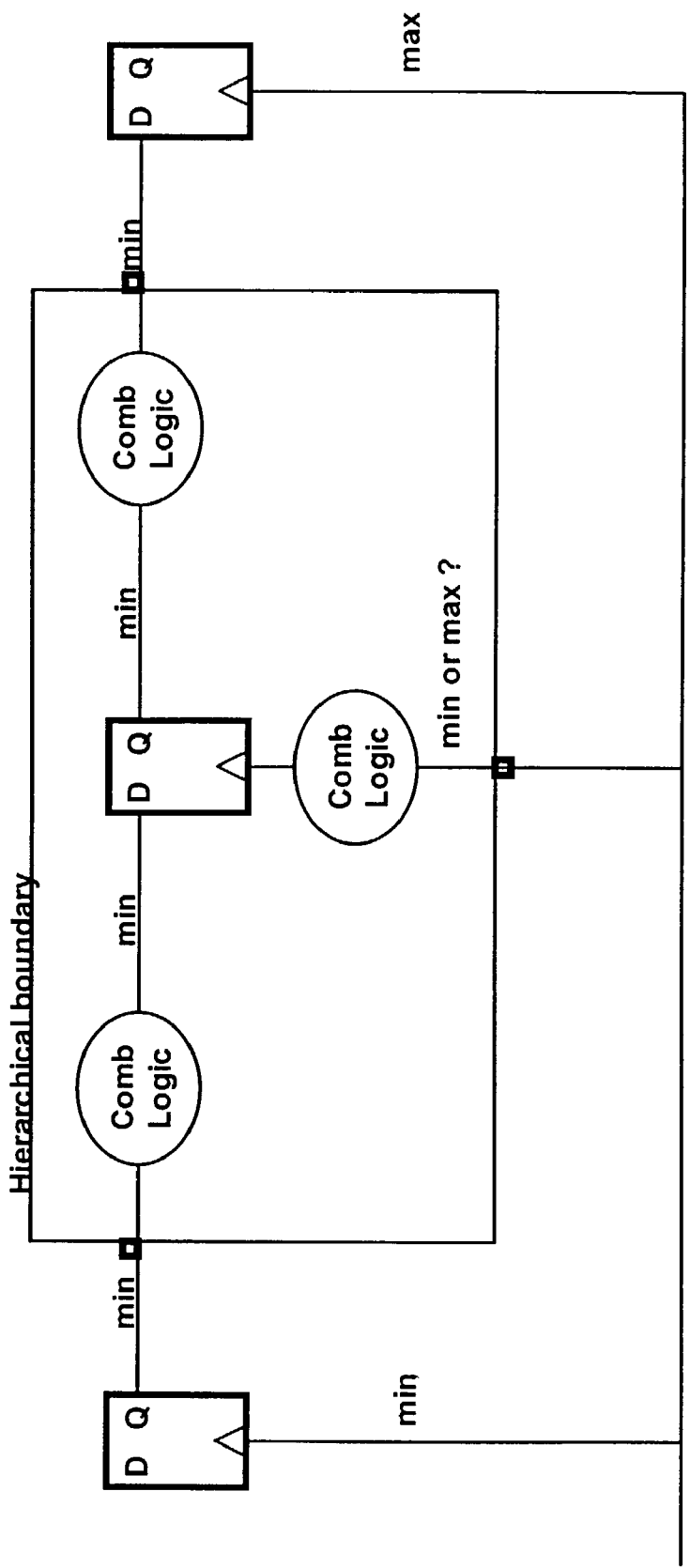
FIG. 8 is a block diagram depicting an illustrative problem in estimating timing delays.
Figure 9:
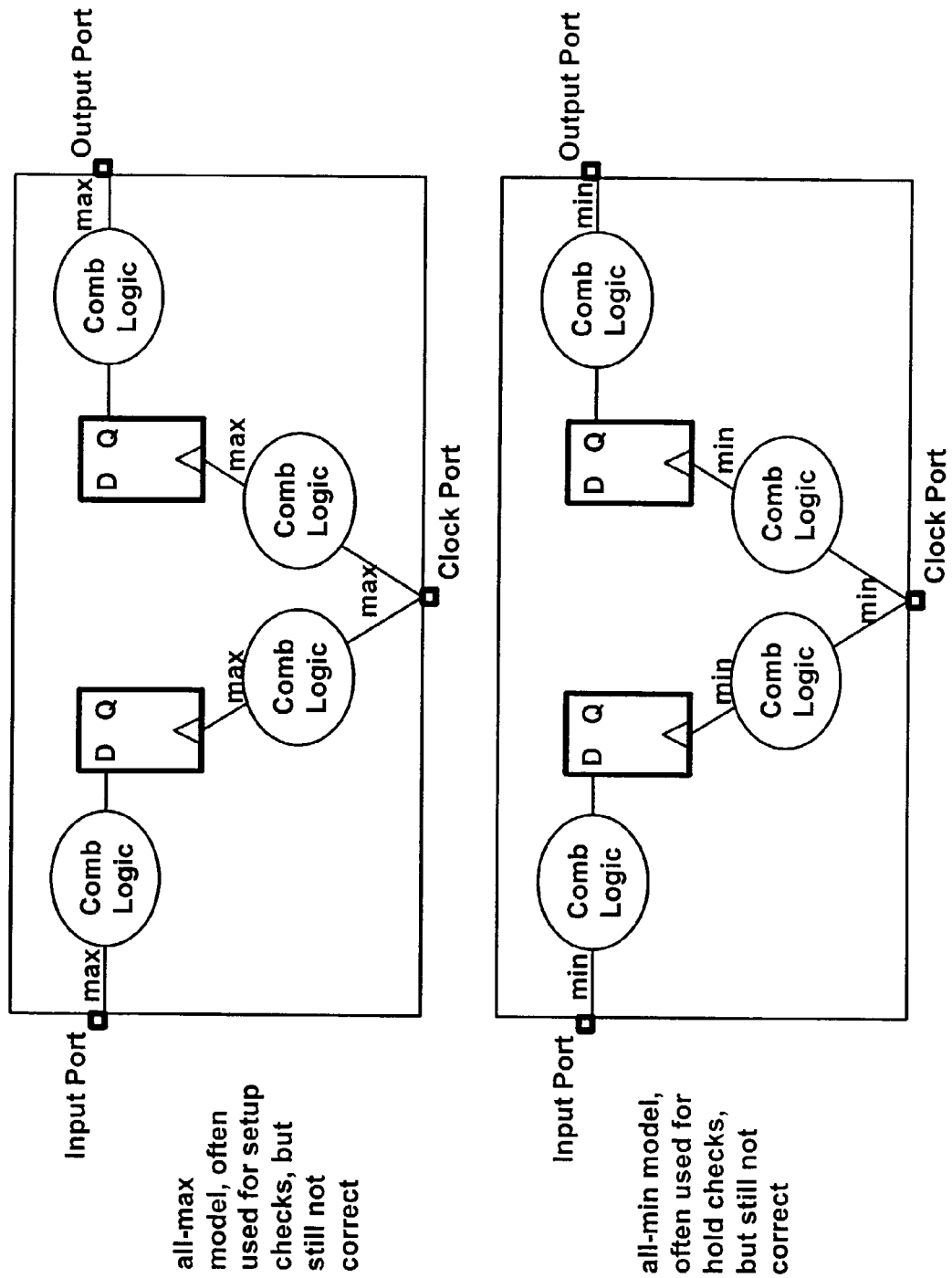
FIG. 9 is a pair of block diagrams depicting a typical prior art approach to estimating timing delays.

This invention addresses the difficulty in enhancing block abstraction methods to provide rigorous maximum/minimum checking across hierarchical boundaries. It is non-trivial, as demonstrated by the several incorrect approaches previously chosen by commercial tools. One of the difficulties of these approaches is that it is not merely a matter of tracing maximum and minimum paths through nets that have a single annotation of delays. FIG. 8 illustrates a situation where the path between the clock port of the block and an interior register would need to have its nets annotated with different delays for generation of input and output constraints, even when both are used for checking only hold-constraints at a parent level. This shows that no single set of net annotations suffices during simultaneous tracing of the required paths needed for the parent's setup/hold checks. Another common mis-step in the prior art is shown in FIG. 9, where two separate path tracing runs are implemented, one based on annotating nets with maximum delays and the other using nets annotated on minimum delays. However, this approach is also insufficient because it doesn't combine the maxima and minima separately on data and clock paths, as required by FIG. 6.

Figure 10:
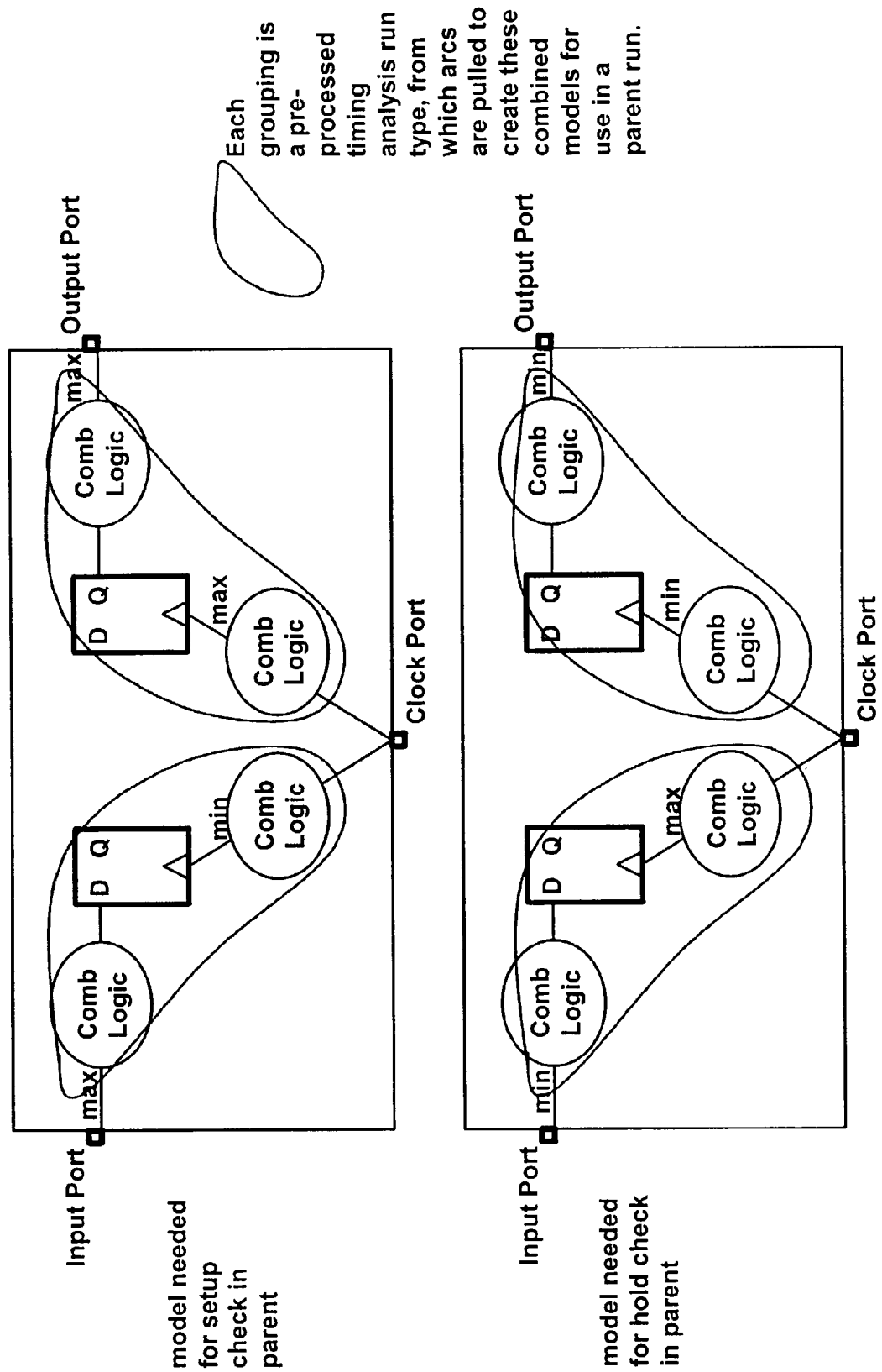
FIG. 10 is a pair of block diagrams depicting an improvement of the present invention in estimating timing delays.

FIG. 10 shows the combinations that are actually required for correct checking. It shows that the paths need to be analyzed separately to produce two different models, where one is used for setup checks in the parent, and the other used for hold checks in the parent. Further, there are actually four different net delay combinations that are needed as input to these path tracing runs.

| Annotate into | Data net delays | Clock net Delays |
|---|---|---|
| Output port propagation delay (used in parent setup check) | Maximum | Maximum |
| Output port propagation delay (used in parent hold check) | Minimum | Minimum |
| Input port setup check | Maximum | Minimum |
| Input port hold check | Minimum | Maximum |

Because commercial tools do not support using multiple annotated values in model abstraction, in the present invention it is first necessary to do pre-processing to produce the four different combinations of net delays in the table above, and to annotate them into the path-tracing runs as shown in FIG. 10. The path-tracing does not need to know how the net-delays were pre-processed, and will therefore work correctly without the static timing tool "knowing" that the data is pre-processed to be different from nominal capacitances. It is then necessary in practicing the invention to recombine the arcs from the four separate path-tracing runs into two separate models, one used in a parent run to determine setup constraints (see FIG. 11) and the other for a parent run finding hold constraints (see FIG. 12). While the use of two different models isn't itself unique, the recombination of arcs from four different path-tracing runs into two separate models is a distinguishing point of this invention.

Model generation is always a consideration in VLSI design, for the simple reason that performing a transistor-level simulation is expensive in both memory and runtime.

Even for flat designs which have no additional hierarchy levels above that of individual gates, the logical gates themselves are represented by timing models during analysis. Prior art provides for model differentiation based on certain operating conditions, so that different models would be used to simulate operation under best-case or worst-case gate fabrication, for example, but then considers the model for that condition to be appropriate for all constraint checks under that condition. The present invention further differentiates the models by type of constraint to be checked and produces such models by combining the arcs of different models to obtain the proper models needed for specific constraint checks in the parent.

Figure 11:
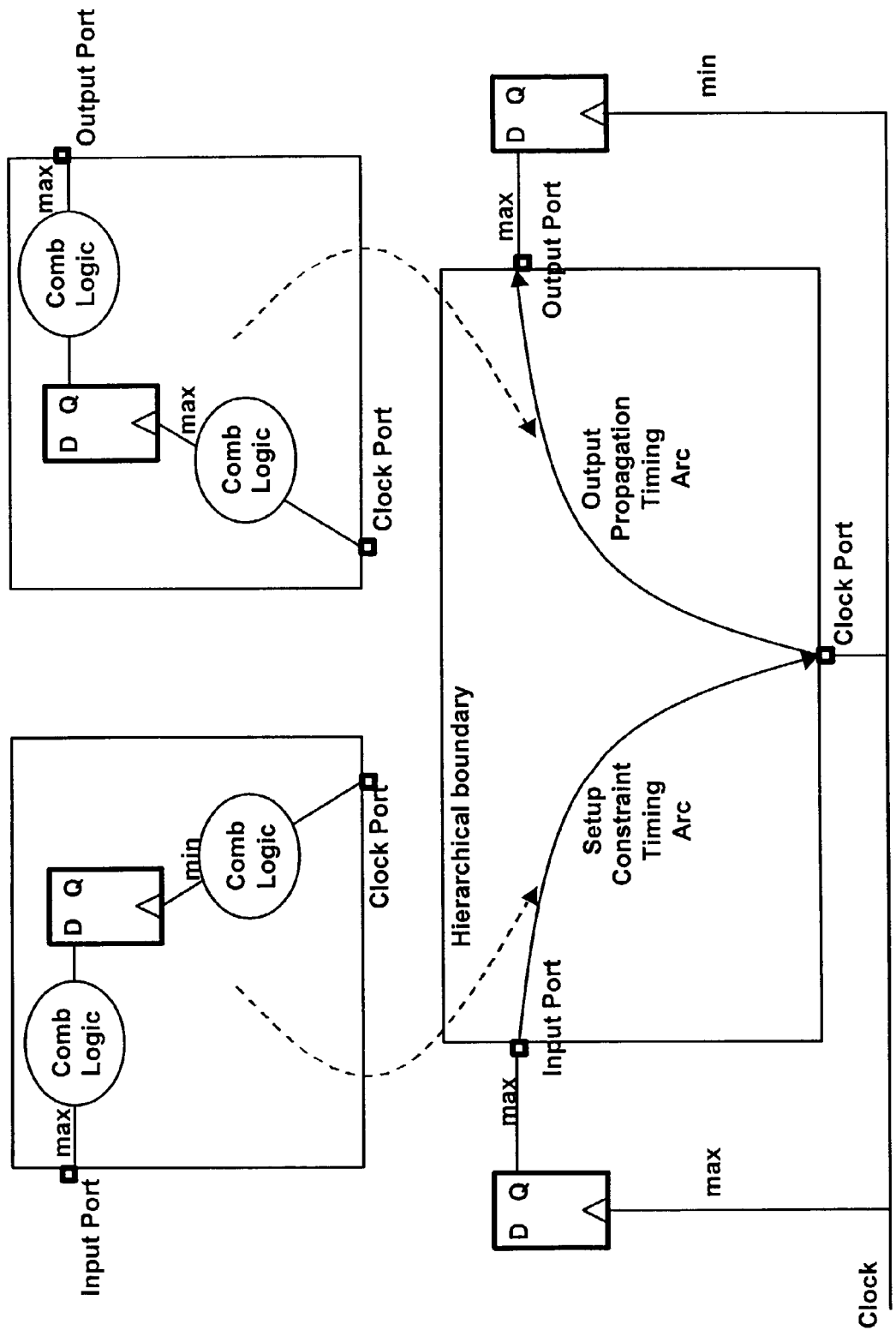
FIGS. 11 and 12 are block diagrams depicting the application of the present invention in estimating timing delays.
Figure 12:
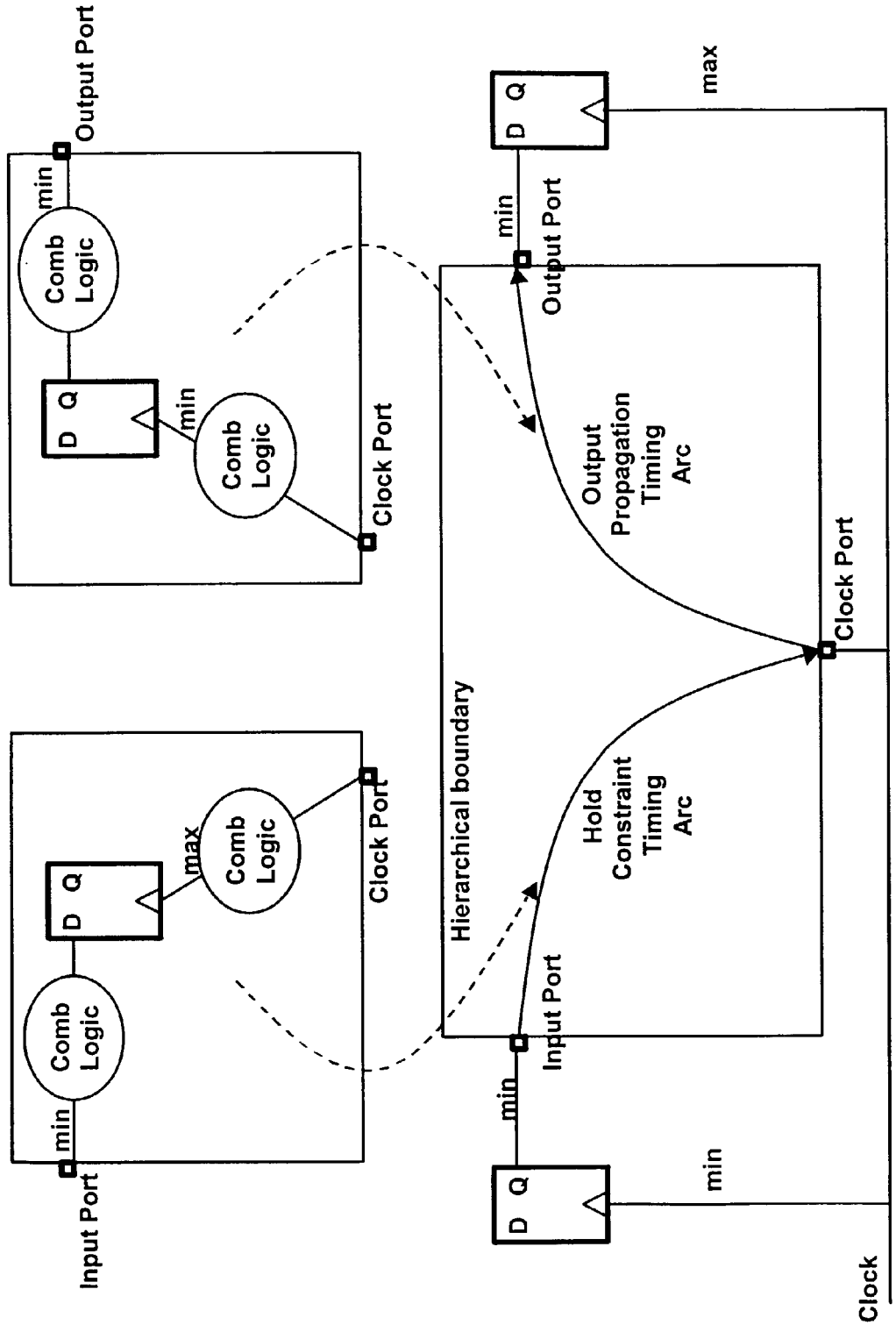

Thus, the present invention involves both the pre-processing of annotation data and the post-processing combination of arcs from different path-tracing runs into the two output models. The pre-processing produces four sets of annotations, one with all minimum annotations, one with all maximum annotations, one with minimum annotations on data nets but maximum annotations on clock nets, and one with minimum annotations on clock nets but maximum annotations on data nets. Models are produced for each of these four annotation sets, and loaded into the static timing analysis tool for individual path-tracing runs. The resulting arcs are then recombined to create final models which are only appropriate for one type of constraint (either hold or setup), but encapsulate the desired goals of the minimum/maximum annotations. For a model which is to be used for parent hold constraint checks, the delay arc from the clock input to a data output is taken from the all-minimum model, but the hold constraint between an input and the clock is taken from the minimum-data-maximum-clock model, as shown in FIG. 12. Likewise, for a model which is to be used for setup constraint checks, the delay arc from clock to output is taken from the all-maximum model, and the setup constraint arc is taken from the minimum-clock-maximum-data model, as shown in FIG. 11. These two models are specific to their constraint type, but the resulting arcs correctly combine to produce an accurate representation of the abstracted portions of the top-level path, and maintain the assumptions of the analysis methodology so that the hierarchical approach produces the exact same reports for all register pair combinations as a rigorous flat run considering the appropriate minimum/maximum data simultaneously.

Differentiation of models by constraint type allows finer control over the characteristics of the model during timing analysis and provides a more solid basis for the engineering judgment to be applied to the results. The rigorous minimum/maximum checking is important to ensure timing correctness, and is more relevant in the finer-geometry processes that have higher proportions of cross-coupling capacitance leading to a bigger difference between the minimum and maximum capacitance values for the same net.

Rigorous minimum/maximum checking encompasses both the clock tree as well as the data connections. It allows ordinary setup and hold checks to also validate the quality of the clock distribution tree, emphasizing local skew instead of global skew, and allow for the possibilities of using "useful skew", as well as not penalizing bad skew where it wouldn't make any difference to the affected setup or hold checks anyway. Further, this rigorous and safe approach to clock tree analysis allows a much lower-power clock distribution scheme using tall clock trees with limited average fan-out, rather than the overkill of more common short-fat solutions that sometimes expend a third of the switching capacitance of the chip just in distributing a core clock.

The completeness of the checks also means that less additive margins need to be added. In many prior approaches, because the process wasn't checking the full correct set of constraints for signals that crossed hierarchical boundaries, designers instead handled the problem by adding margins to account for the inaccuracies of not actually considering the correct arcs. This invention reduces the margins that are needed, thereby increasing potential design performance. Further, by generating models which have constraint-specific safety margins for the characteristics of each of their ports, the overall safety margin at the higher hierarchy level can be reduced without sacrificing the safety margin for the constraint at any particular port. This leads to fewer timing paths falsely being reported as problems needing to be fixed at the higher level, and speeds timing closure.

In the early stages of physical implementation, it is best to set high goals for both internal block timing and for the top-level timing (as judged by linearized signal velocity, discussed earlier). As a design progresses toward tapeout, and the top-level timing gets replaced with actual timing models derived from routed and timed blocks, the goals can be relaxed towards the eventual tapeout requirement target. Because gate-sizing changes, repeater insertion, and hold-element insertion all are "disruptions" in a routed design, they can have timing effects on neighboring objects (cell instances) or wires.

The objective is to assure convergence by seeking to "touch" fewer and fewer nets and objects with each fix/re-time iteration. A good goal is to see that the number of touched nets decreases by a factor of 4 to 8 for each iteration. Even slight reductions in the goals sought at each iteration aid greatly in convergence.

Figure 13:
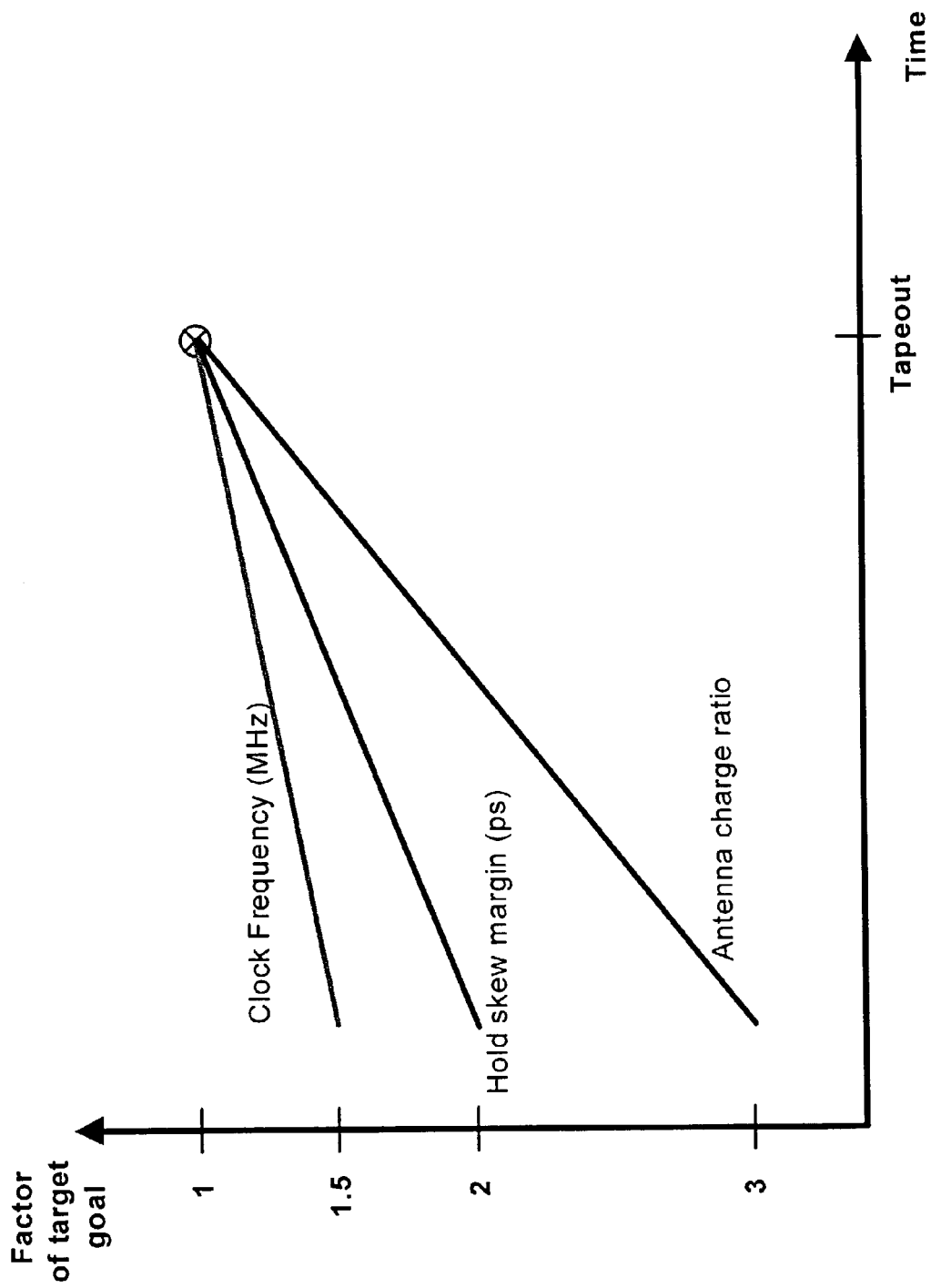
FIG. 13 is a diagram useful in understanding how various design techniques of the present invention converge in producing a final product.

FIG. 13 shows this principle, where the y-axis is measured as factors with respect to the eventual target for each quantity:

| Criteria | Quantity |
| --- | --- |
| Setup checks | Clock Frequency |
| Hold checks | Skew margin |
| Antenna checks | Allowable charge ratio |

In effect, convergence proceeds along these three axes simultaneously. Even though earlier passes do somewhat more "work" by seeking to fix issues based on a stricter criteria, this approach lessens the number of items that have to be re-worked when their neighboring wires or objects get bumped. For example, violations in the allowable antenna charge ratio (a rule aiding yield by limiting the ratio between the area of metal wires and the polysilicon gate area they connect to) are easily fixed, but since these fixes touch routing, the fixes can disrupt tight setup or hold paths. So, convergence is improved by simultaneously and incrementally lowering the bar on all goals towards the required targets.

As will be apparent to those skilled in the art, numerous modifications can be made in the present invention.

The invention claimed is:

1. A method of adjusting timing of a clock signal provided to a first block and a second block where data signals travel via a first path from the first block to the second block and data signals travel via a second path from the second block to the first block and the time for the data signals to travel the first path is greater than the time for the data signals to travel the second path comprising the step of delaying the clock signal provided to the second block relative to the clock signal provided to the first block by an amount that is a function of the difference between the time for the data signals to travel the first path and the time for the data signals to travel the second path.

2. The method of claim 1 wherein the clock signal is delayed by an amount that is a function of one half the difference between the time for the data signals to travel the first path and the time for the data signals to travel the second path.

3. The method of claim 1 wherein the clock signal is delayed by an amount that is a function of the difference between the time for the data signals to travel the first path and the time for the data signals to travel the second path.

4. The method of claim 1 wherein the clock signal is delayed by an amount that is one half the difference between the time for the data signals to travel the first path and the time for the data signals to travel the second path.

* * * * *

UNITED STATES PATENT AND TRADEMARK OFFICE
CERTIFICATE OF CORRECTION

| | | |
|---|---|---|
| PATENT NO. | : 7,243,323 B2 | Page 1 of 1 |
| APPLICATION NO. | : 10/231384 | |
| DATED | : July 10, 2007 | |
| INVENTOR(S) | : Ted E. Williams et al. | |

It is certified that error appears in the above-identified patent and that said Letters Patent is hereby corrected as shown below:

In the Specification:

On the cover page: Please include the field --(63) Related U.S. Application Data, This application claims benefit of 60/315,995, filed August 29, 2001.--

At column 7, line 27, "its" should read --it is--

At column 7, line 52, "0.25 um" should read --0.25 μm--

Signed and Sealed this

Eighteenth Day of September, 2007

JON W. DUDAS
*Director of the United States Patent and Trademark Office*